United States Patent
Buttjer

(10) Patent No.: US 9,788,471 B2
(45) Date of Patent: Oct. 17, 2017

(54) LINK ASSEMBLY

(71) Applicant: Deere & Company, Moline, IL (US)

(72) Inventor: Jeffrey A. Buttjer, Waverly, IA (US)

(73) Assignee: Deere & Company, Moline, IL (US)

(*) Notice: Subject to any disclaimer, the term of this patent is extended or adjusted under 35 U.S.C. 154(b) by 8 days.

(21) Appl. No.: 14/580,427

(22) Filed: Dec. 23, 2014

(65) Prior Publication Data

US 2016/0174452 A1  Jun. 23, 2016

(51) Int. Cl.
*A01B 59/06* (2006.01)
*A01B 59/00* (2006.01)

(52) U.S. Cl.
CPC .......... *A01B 59/068* (2013.01); *A01B 59/004* (2013.01)

(58) Field of Classification Search
CPC .................................................. A01B 59/004
USPC ............ 172/448; 403/43; 24/270; 280/416.2
See application file for complete search history.

(56) References Cited

U.S. PATENT DOCUMENTS

| | | | | |
|---|---|---|---|---|
| 1,277,296 A * | 8/1918 | Curtner | ................... | B60C 27/08 24/68 TT |
| 2,157,451 A * | 5/1939 | Haubert | ................ | B60P 7/0838 24/270 |
| 2,359,492 A * | 10/1944 | Rockwood et al. | .... | F16G 11/10 24/68 CT |
| 2,564,821 A * | 8/1951 | Smith | ................... | B60P 7/0838 24/273 |
| 2,888,997 A * | 6/1959 | Fraga | ................... | A01B 59/066 172/448 |
| 3,310,123 A * | 3/1967 | Abbott | ................ | A01B 59/041 172/450 |
| 3,418,008 A * | 12/1968 | Durbin | .................. | B60P 7/0838 24/270 |
| 4,368,899 A | 1/1983 | Smalley et al. | | |
| 4,715,770 A | 12/1987 | Kryscyk | | |
| 4,738,463 A | 4/1988 | Poore et al. | | |
| 4,763,743 A | 8/1988 | Ridgway | | |
| 7,237,977 B2 * | 7/2007 | Kay | ...................... | B60P 7/0838 403/43 |
| 8,770,612 B2 | 7/2014 | Wendte et al. | | |

(Continued)

OTHER PUBLICATIONS

GDS GmbH, Gangl Docking System, product description web page, retrieved Oct. 8, 2014 from http://www.ganglsystems.com/en/product/.

(Continued)

*Primary Examiner* — Thomas B Will
*Assistant Examiner* — Joel F. Mitchell
(74) *Attorney, Agent, or Firm* — Taft Stettinius & Hollister LLP; Stephen F. Rost

(57) ABSTRACT

A link assembly for a hitch includes a first link and a second link. The second link has first and second spaced apart bores extending therethrough. A coupling member is attached to an end of the first link. The coupling member includes first and second spaced apart coupling plates. The coupling member has a load bore extending through the first and second coupling plates and has a plurality of index bores extending through the first and second coupling plates. A load pin is receivable by the load bore and the first bore, and pivotally couples the second link to the first link. An index pin is removably receivable by the second bore and a selected index bore, and the index pin is movable independently of the load pin.

16 Claims, 3 Drawing Sheets

(56) References Cited

U.S. PATENT DOCUMENTS

2013/0037283 A1* 2/2013 Laubner et al. ..... A01B 59/004
172/439

OTHER PUBLICATIONS

Photograph of Walterscheid link coupler, Nov. 16, 2011 (2 pages).
German Search Report, dated Jan. 18, 2017.

* cited by examiner

LINK ASSEMBLY

FIELD

The present disclosure relates to a link assembly, such as may be used in a three point hitch used on agricultural tractors.

BACKGROUND

A conventional hitch assembly, such as a three point hitch used on agricultural tractors, includes lift links which couple the draft links to the lift arms and lift cylinders. In certain situations, it is desirable to lift the draft links out of the way for towing and transport needs. For this purpose, a two-piece lift link assembly is commercially available. This assembly includes a lower link with a lower pivot member, and an upper link with an upper pivot member. Each pivot member includes a pair of spaced apart pivot tabs. Each tab includes a coupling bore. This link assembly also includes a pin plate and a pair of pins which can be selectively inserted through the bores to couple the links together in different orientations. However, one of the pins is permanently fixed to the pin plate. As a result, in order to change the relative orientation of the two links, the pin plate and both pins must be completely removed from the links, thus fully un-coupling the two links from each other. This is undesirable because the links are heavy and difficult to manipulate when there is nothing holding them together. It is desired to have a link assembly which can be placed in different configurations without the links being completely un-coupled from each other.

SUMMARY

According to an aspect of the present disclosure, a link assembly is provided for a hitch between a lift arm and a draft link. The link assembly includes a first link and a second link. The second link has first and second spaced apart bores extending therethrough. A coupling member is attached to an end of the first link. The coupling member includes a base and a pair of spaced apart coupling plates attached to the base. A load bore extends through the first and second coupling plates, and spaced apart index bores extending through the first and second coupling plates. A load pin is receivable by the load bore and the first bore to pivotally coupling the second link to the first link. An index pin is removably receivable by the second bore and a selected index bore.

The index bores are spaced radially outwardly from the load bore. The first link is adapted to be coupled to a draft link of the hitch, and the second link is adapted to be coupled to a lift arm of the hitch.

DETAILED DESCRIPTION OF THE DRAWINGS

Figure 1:
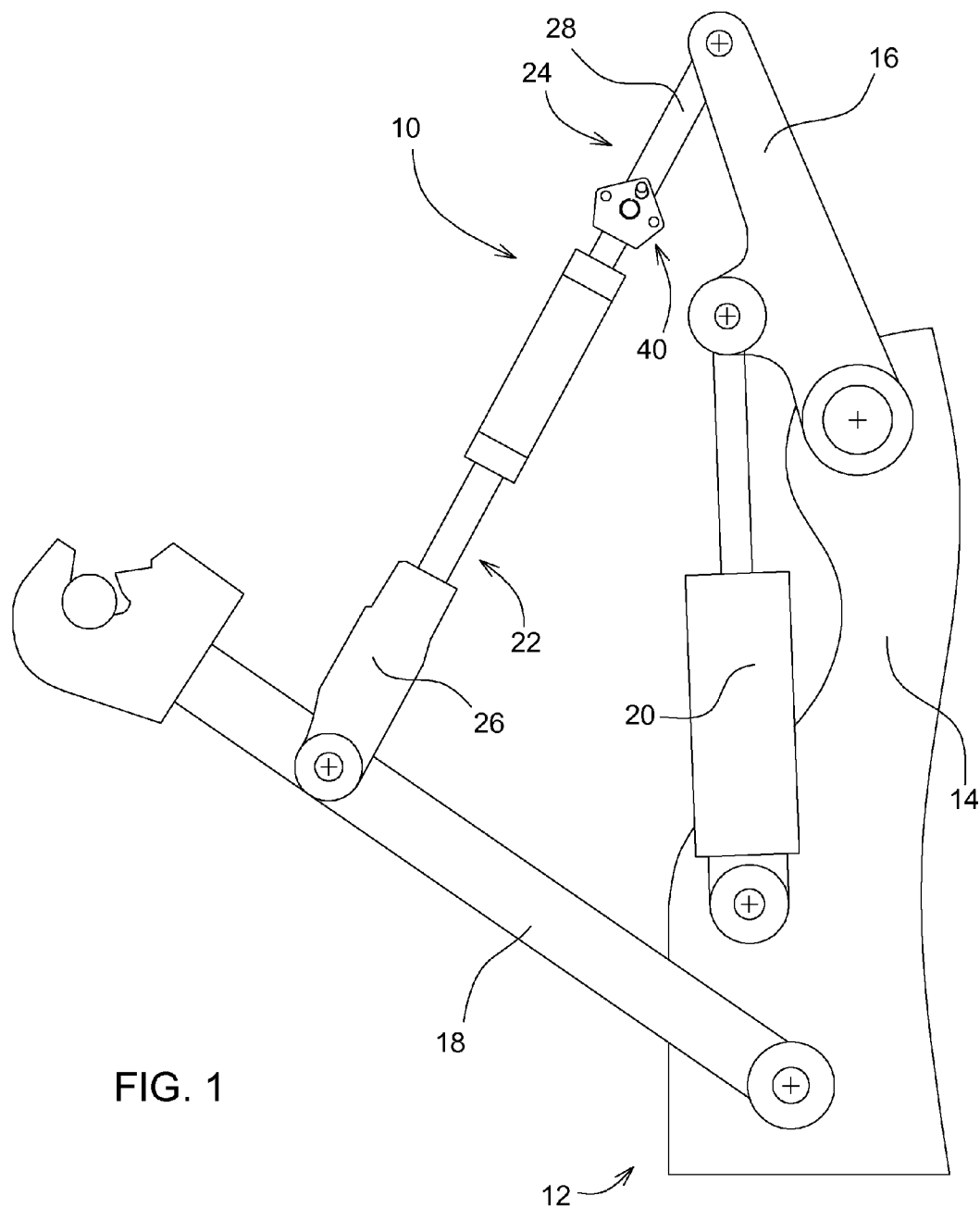
FIG. 1 is a side view of a hitch including a link assembly embodying the invention.

Referring to FIG. 1, a lift link assembly 10 is provided for a hitch 12, such as a hitch of an agricultural tractor. The hitch 12 includes a hitch frame part 14, a lift arm 16, a draft link 18 and a lift cylinder 20. The lift arm 16 and draft link 18 have forward ends which are pivotally coupled to the frame part 14. The lift link assembly 10 is coupled between the lift link 16 and the draft link 18.

The lift link assembly 10 includes a first or lower link 22 and a second or upper link 24. A lower end 26 of the lower link 22 is adapted to be coupled to the draft link 18. An upper end 22 of the upper link 24 is adapted to be coupled to the lift arm 16.

Figure 2:
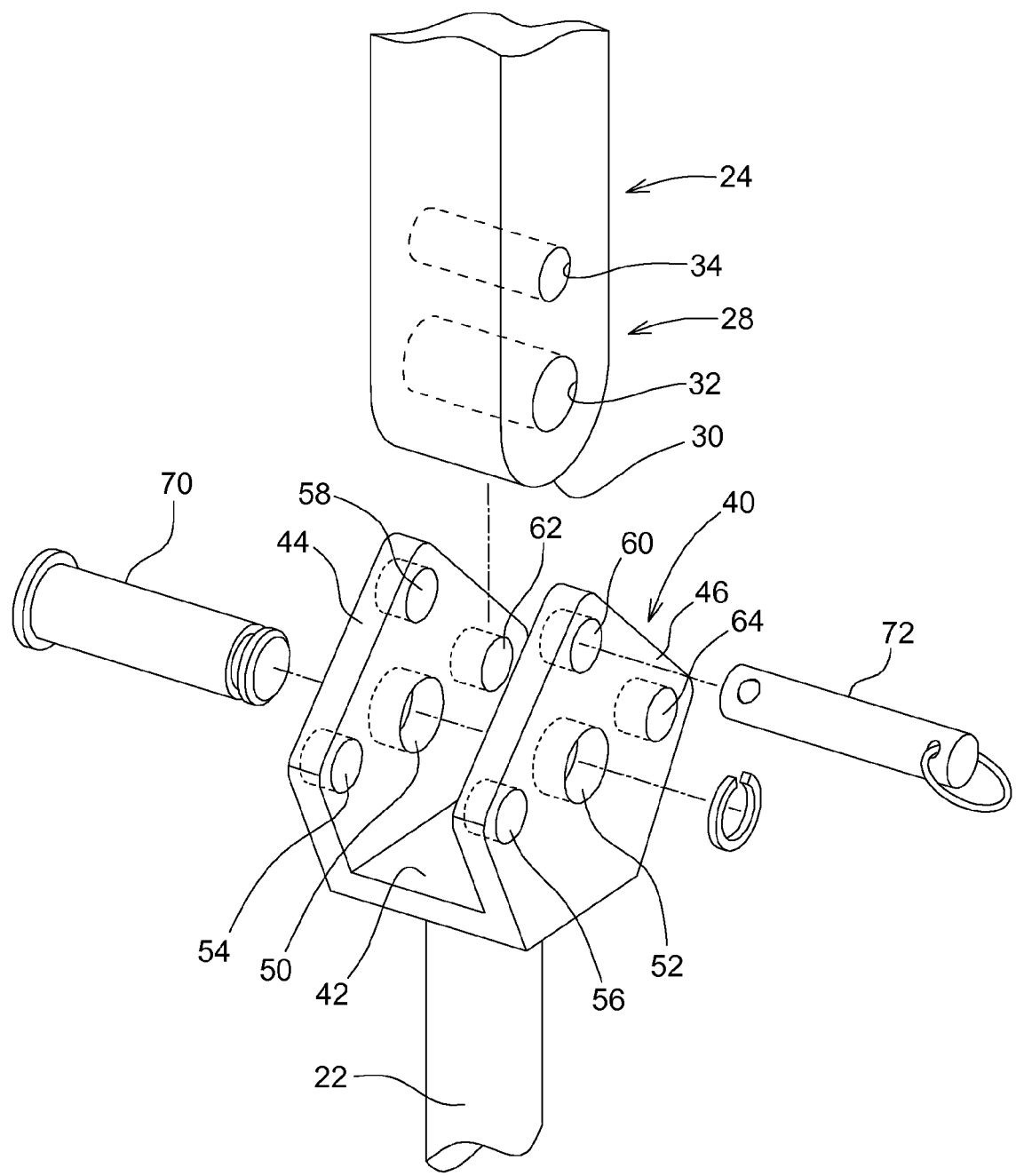
FIG. 2 is an enlarged perspective view of a portion of the link assembly of FIG. 1.

Referring now to FIGS. 1 and 2, the upper link 24 has a lower end 28 with a semi-circular or cylindrical end surface 30. A larger diameter pivot or load bore 32 extends through the lower end 28 of the upper link 24 and is spaced apart from end surface 30. A smaller diameter index bore 34 also extends through the lower end 28 of the upper link 24. Index bore 34 is spaced apart from load bore 32, and load bore 32 is positioned between index bore 34 and the end surface 30.

A coupling bracket 40 is mounted at the upper end of lower link 22. Bracket 40 includes a base 42 and may have a pair of spaced apart plates 44 and 46 which project away from opposite ends of the base 42. Aligned load bores 50 and 52 extend through a central portion of plates 44 and 46. Aligned first index bores 54 and 56 extend through a peripheral portion of plates 44 and 46. Aligned second index bores 58 and 60 extend through the peripheral portion of plates 44 and 46. Aligned third index bores 62 and 64 extend through the peripheral portion of plates 44 and 46. These index bores are spaced apart from each other and are spaced apart radially outwardly from the corresponding load bores 50 and 52. The load bores 32, 50 and 52 may have a larger diameter than the diameters of the index bores 34 and 54-64.

Preferably, index bore 58 load bore 50, and index bore 60 and load bore 52 are aligned parallel to a longitudinal axis of the lower link 22. Preferably, index bore 54 load bore 50, and index bore 56 and load bore 52 are aligned at an angle with respect to the longitudinal axis of the lower link 22. Similarly, index bore 62 and load bore 50, and index bore 64 and load bore 52 are also aligned at an angle with respect to the longitudinal axis of the lower link 22. Load bore 50 may be positioned between index bores 54 and 62, and load bore 52 may be positioned between index bores 56 and 64.

A load pin 70 is removably insertable through load bores 54, 32 and 52 to pivotally couple the upper link 24 to the lower link 22. An index pin 72 is removably insertable through index bores 54, 34 and 56 to hold links 24 and 22 at a first angle with respect to each other. Index pin 72 is removably insertable through index bores 58, 34 and 60 to hold links 24 and 22 aligned with each other. The index pin 72 is removably insertable through index bores 62, 34 and 64 to hold links 24 and 22 at a second angle with respect to each other. The index pin 72 is movable independently of the load pin 70.

Figure 3:
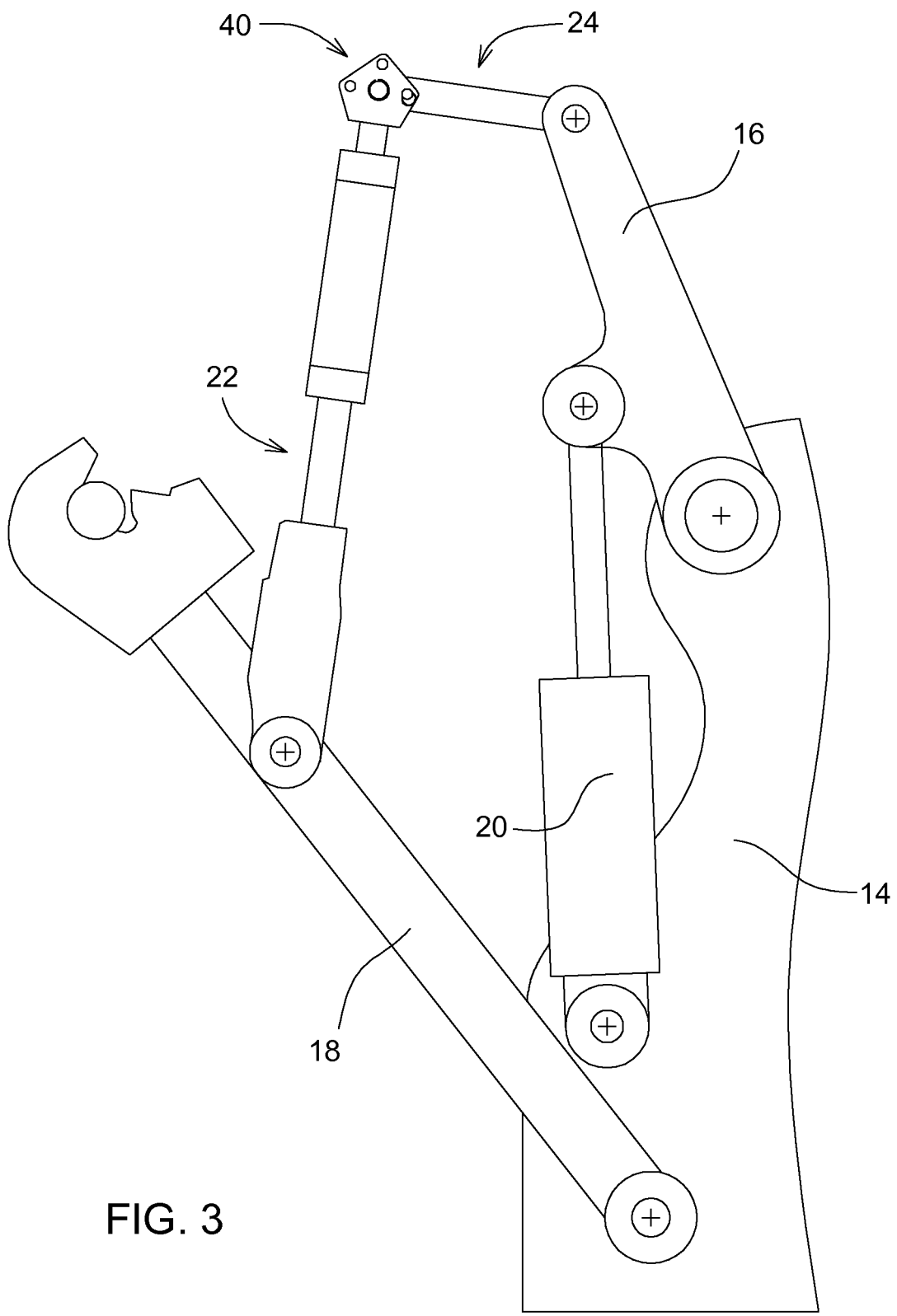
FIG. 3 is a side view of the link assembly of FIG. 1 with the links angled with respect to each other.

With this design the upper and lower links 24 and 22 can remain pivotally coupled to each other by the load pin 70 while the index pin 72 is removed from the plates 44 and 46 so that the links 24 and 22 can be rotated with respect to each other from the aligned position shown in FIG. 1 to an angled position as shown in FIG. 3 wherein the draft link is raised to a storage position.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A link assembly for a hitch, the link assembly comprising:
   a first link including a longitudinal axis;
   a second link, the second link having a first bore extending therethrough, and having a second bore extending therethrough and spaced apart from the first bore;
   a coupling member attached to an end of the first link, the coupling member having a pair of coaxially aligned load bores aligned along the longitudinal axis of the first link and a plurality of pairs of coaxially aligned index bores, the plurality of pairs of coaxially aligned index bores being spaced apart from each other and spaced radially outwardly from the pair of coaxially aligned load bores, wherein one of the pairs of coaxially aligned index bores has a fixed location along the longitudinal axis of the first link, and another of the pairs of coaxially aligned index bores has a fixed location offset from the longitudinal axis of the first link;
   a load pin receivable by the pair of coaxially aligned load bores and the first bore and pivotally coupling the second link to the first link; and
   an index pin which is receivable by the second bore and each of a selected one of the plurality of pairs of coaxially aligned index bores, the index pin being movable independently of the load pin, wherein the location of each of the pairs of coaxially aligned index bores remains fixed with respect to the longitudinal axis.

2. The link assembly of claim 1, wherein:
   the first link is adapted to be coupled to a draft link of the hitch; and
   the second link is adapted to be coupled to a lift arm of the hitch.

3. The link assembly of claim 1, wherein the coupling member further comprises:
   a base;
   a first coupling plate attached to the base; and
   a second coupling plate attached to the base, the second coupling plate being spaced apart from the first coupling plate, the pair of coaxially aligned load bores and the plurality of pairs of coaxially aligned index bores extending through the first and second coupling plates.

4. The link assembly of claim 3, wherein:
   an end of the second link is received between the first and second coupling plates.

5. The link assembly of claim 1, wherein the coupling member further comprises:
   a first coupling plate; and
   a second coupling plate spaced apart from the first coupling plate, the pair of coaxially aligned load bores and the plurality of pairs of coaxially aligned index bores extending through the first and second coupling plates.

6. The link assembly of claim 1, wherein:
   the load pin remains inserted in the pair of coaxially aligned load bores and the first bore as the first and second links are rotated with respect to each other.

7. A link assembly for a hitch, the link assembly comprising:
   a first link;
   a second link, the second link having a first bore extending therethrough, and having a second bore extending therethrough and spaced apart from the first bore;
   a coupling member attached to an end of the first link, the coupling member comprising a base, a first coupling plate attached to the base, and a second coupling plate attached to the base, the second coupling plate being spaced apart from the first coupling plate, the coupling member having a load bore extending through the first and second coupling plates and having an a plurality of pairs of coaxially aligned index bores extending through the first and second coupling plates, wherein one of the pairs of coaxially aligned index bores has a fixed location along the longitudinal axis of the first link, and another of the pairs of coaxially aligned index bores has a fixed location offset from the longitudinal axis of the first link;
   a load pin receivable by the load bore and the first bore and pivotally coupling the second link to the first link; and
   an index pin which is removably receivable by the second bore and each of the plurality of pairs of coaxially aligned index bores, the index pin being movable independently of the load pin, wherein the location of each of the pairs of coaxially aligned index bores remains fixed with respect to the longitudinal axis.

8. The link assembly of claim 7, wherein:
   each of the plurality of pairs of coaxially aligned index bores is spaced apart from the load bore.

9. The link assembly of claim 7, wherein:
   the plurality of pairs of coaxially aligned index bores are spaced radially outwardly from the load bore.

10. The link assembly of claim 7, wherein:
    the first link is adapted to be coupled to a draft link of the hitch; and
    the second link is adapted to be coupled to a lift arm of the hitch.

11. A link assembly for a hitch, the link assembly comprising:
    a first link;
    a second link, the second link having a first bore extending therethrough, and having a second bore extending therethrough and spaced apart from the first bore;
    a coupling member attached to an end of the first link, the coupling member comprising a first coupling plate, and a second coupling plate spaced apart from the first coupling plate, the coupling member having a load bore extending through the first and second coupling plates and having a plurality of pairs of coaxially aligned index bores extending through the first and second coupling plates, wherein one of the pairs of coaxially aligned index bores has a fixed location along the longitudinal axis of the first link, and another of the pairs of coaxially aligned index bores has a fixed location offset from the longitudinal axis of the first link;
    a load pin receivable by the load bore and the first bore and pivotally coupling the second link to the first link; and
    an index pin which is removably receivable by the second bore and each of the plurality of pairs of coaxially aligned index bores, the index pin being movable independently of the load pin, wherein the location of each of the pairs of coaxially aligned index bores remains fixed with respect to the longitudinal axis.

12. The link assembly of claim 11, wherein:
each of the plurality of pairs of coaxially aligned index bores is spaced apart from the load bore.
13. The link assembly of claim 11, wherein:
the plurality of pairs of coaxially aligned index bores are spaced radially outwardly from the load bore.
14. The link assembly of claim 11, wherein:
the first link is adapted to be coupled to a draft link of the hitch; and
the second link is adapted to be coupled to a lift arm of the hitch.
15. The link assembly of claim 11, wherein:
the load pin has a first diameter and the index pin has a second diameter smaller than the first diameter.
16. The link assembly of claim 11, wherein:
the coupling member further comprises a base attached to an end of the first link, the first and second coupling plates projecting from the base.

\* \* \* \* \*